(12) United States Patent
Sorin

(10) Patent No.: US 6,407,805 B1
(45) Date of Patent: Jun. 18, 2002

(54) TIME DELAY MEASUREMENT USING OPTICAL SIGNALS MODULATED AT MULTIPLE FREQUENCIES

(75) Inventor: Wayne V. Sorin, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 27 days.

(21) Appl. No.: 09/585,260

(22) Filed: Jun. 2, 2000

(51) Int. Cl.[7] .............................................. G01N 21/00
(52) U.S. Cl. ..................................................... 356/73.1
(58) Field of Search ............................. 356/73.1, 450, 356/345; 385/37, 10, 4, 127, 11

(56) References Cited

U.S. PATENT DOCUMENTS

| | | | | |
|---|---|---|---|---|
| 4,750,833 A | * | 6/1988 | Jones | ........................ 356/73.1 |
| 4,752,125 A | * | 6/1988 | Schicketanz et al. | ...... 356/73.1 |
| 4,799,790 A | * | 1/1989 | Tsukamoto et al. | ........ 356/73.1 |

* cited by examiner

Primary Examiner—Frank G. Font
Assistant Examiner—Tu T Nguyen

(57) ABSTRACT

A system and method measures the time delay and chromatic dispersion of a test component. Two or more optical signals at a plurality of wavelengths are transmitted through the test component at different modulations. A phase angle error may be calculated according to the magnitude of the transfer function of the component and the measured phase and magnitude of one or more of the transmitted optical signals. This phase angle error is removed from the measured phases of the optical signals. To recover any lost high frequency content, the time delay and chromatic dispersion may be determined from at least two of the transmitted optical signals.

21 Claims, 9 Drawing Sheets

TIME DELAY MEASUREMENT USING OPTICAL SIGNALS MODULATED AT MULTIPLE FREQUENCIES

FIELD OF THE INVENTION

The present invention relates generally to devices and methods for measuring time delay and chromatic dispersion, and more particularly to devices and methods for accurately measuring the time delay and chromatic dispersion in a component by use of optical signals hose amplitudes are modulated at two or more modulation frequencies.

BACKGROUND OF THE INVENTION

A conventional method for measuring chromatic dispersion in fibers is to amplitude modulate the output of a tunable single wavelength laser. As the laser frequency is tuned, the phase shift on the AM modulation changes in response to the dispersion in the fiber. In the Fourier or frequency domain, the amplitude modulated signal has two AM sidebands. The phase difference between the two AM sidebands is proportional to a delay in the fiber. The delay measured at various optical frequencies in the fiber is then used to determine the chromatic dispersion of the fiber. This method for measuring chromatic dispersion works adequately for measuring fiber dispersion where the dispersion changes are small relative to the spacing in frequency of the two AM sidebands. It also works adequately when there is no differential attenuation in the two AM sidebands.

When making a conventional chromatic dispersion (CD) measurement of a long fiber, which is the frequency derivative of a time delay, two conditions are normally assumed. The first assumption is that the fiber dispersion does not change rapidly in the frequency range defined by the spacing of the AM sidebands. This assumption allows the differential phase measurement sampled at the frequency spacing between the two sidebands to accurately approximate a derivative operation. The second assumption is that there in no amplitude filtering of the input signal. This second assumption allows the relative magnitudes for the two AM sidebands to remain unchanged after passing through the fiber. When measuring the chromatic dispersion of components that have optical characteristics that change rapidly depending upon optical frequency, however, both the magnitude and phase can vary quickly relative to the spacing of the AM sidebands, which causes errors in the dispersion measurement.

This conventional measurement method becomes inaccurate when trying to measure the dispersion of devices that have optical characteristics that change rapidly depending upon optical frequency, such as narrow band wavelength division multiplexing (WDM) components. Significant changes in the dispersion or time delay that occur within the frequency range defined by the spacing of the AM sidebands are filtered out. Also, as the two AM sidebands experience differential attenuation due to the filtering effects of these components, an error in the dispersion measurement may occur.

As shown in FIG. 1A, an optical signal having an optical frequency of $\omega_0$ and two sidebands $-\omega_m$ and $+\omega_m$ is passed through a component 5 under test, such as a fiber, which has a transfer function $H(\omega)$. The real time delay, $\tau_g$, for this signal is equal to the derivative of the phase shift with respect to frequency, as shown in FIG. 1B. An approximate time delay, $\tau_m$, can be determined by dividing the difference in phase between the two sidebands by the difference in frequency, which is $2\omega_m$. As shown in FIG. 1B, the slope of the curve at $\omega_o$ has a negative slope, meaning that the real time delay $\tau_g$ has a negative value. However, the slope between the points corresponding to the frequencies of the sidebands has a positive slope, meaning that the approximate time delay $\tau_m$ has a positive value. Accordingly, the approximation used to measure the time delay is inaccurate for fast changes in $\tau_g$.

To reduce the errors resulting from differential attenuation, it is possible to reduce the modulation frequency. The reduction in modulation frequency, however, also produces errors. In particular, the reduction causes the phase shifts in the input and the output signals to be impossible to detect, making the phase measurements inaccurate. Since the phase difference, which is directly related to the delay, cannot be measured accurately with the reduced modulation frequency, it is not possible to measure the dispersion accurately.

SUMMARY OF THE INVENTION

A method for measuring time delay of a component, consistent with the present invention, measures the phase and magnitude of at least two optical signals output from the component, the at least two optical signals having different modulations. The measured phase and magnitude of the at least two optical signals are adjusted by correcting the measured magnitude of the at least two optical signals for differential attenuation and recovering frequency content in the measured phase of the at least two optical signals. The time delay of the component is determined based upon the adjusted phase and magnitude of the at least two optical signals.

DETAILED DESCRIPTION OF THE PREFERRED EMBODIMENT

Systems and methods consistent with the present invention may use signal processing steps to account for the differential attenuation of AM sidebands, which produces an error in the conventional chromatic dispersion measurement methods. In addition, methods and systems consistent with the present invention may recover frequency content in the time delay by using two or more AM modulation frequencies and signal processing techniques. High frequency ripple may be recovered even though it occurs at a frequency much greater than the AM sideband spacing. The high frequency ripple corresponds to variations that occur within the frequency range set by the spacing between the AM modulation.

Figure 1A:
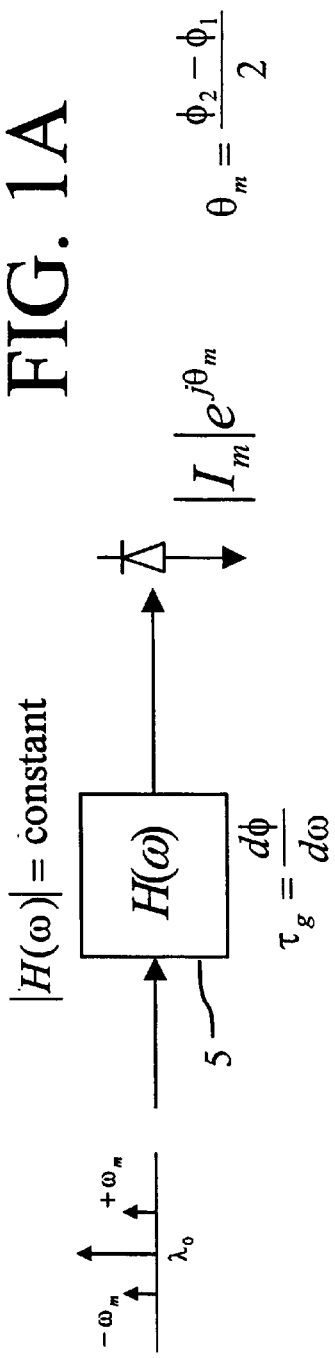
FIG. 1A is a diagram of a single optical signal being transmitted through a component under test.
Figure 1B:
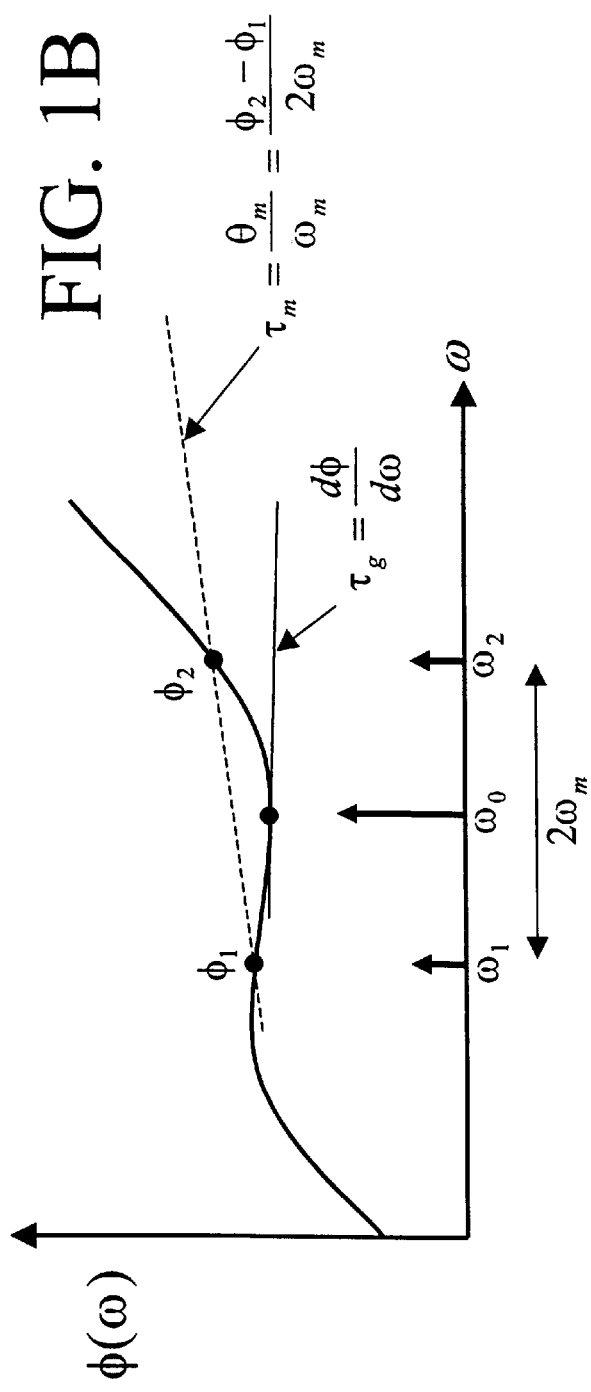
FIG. 1B is a graphical representation of the measured phase with respect to frequency of the optical signal output from the component in FIG. 1A.
Figure 2:
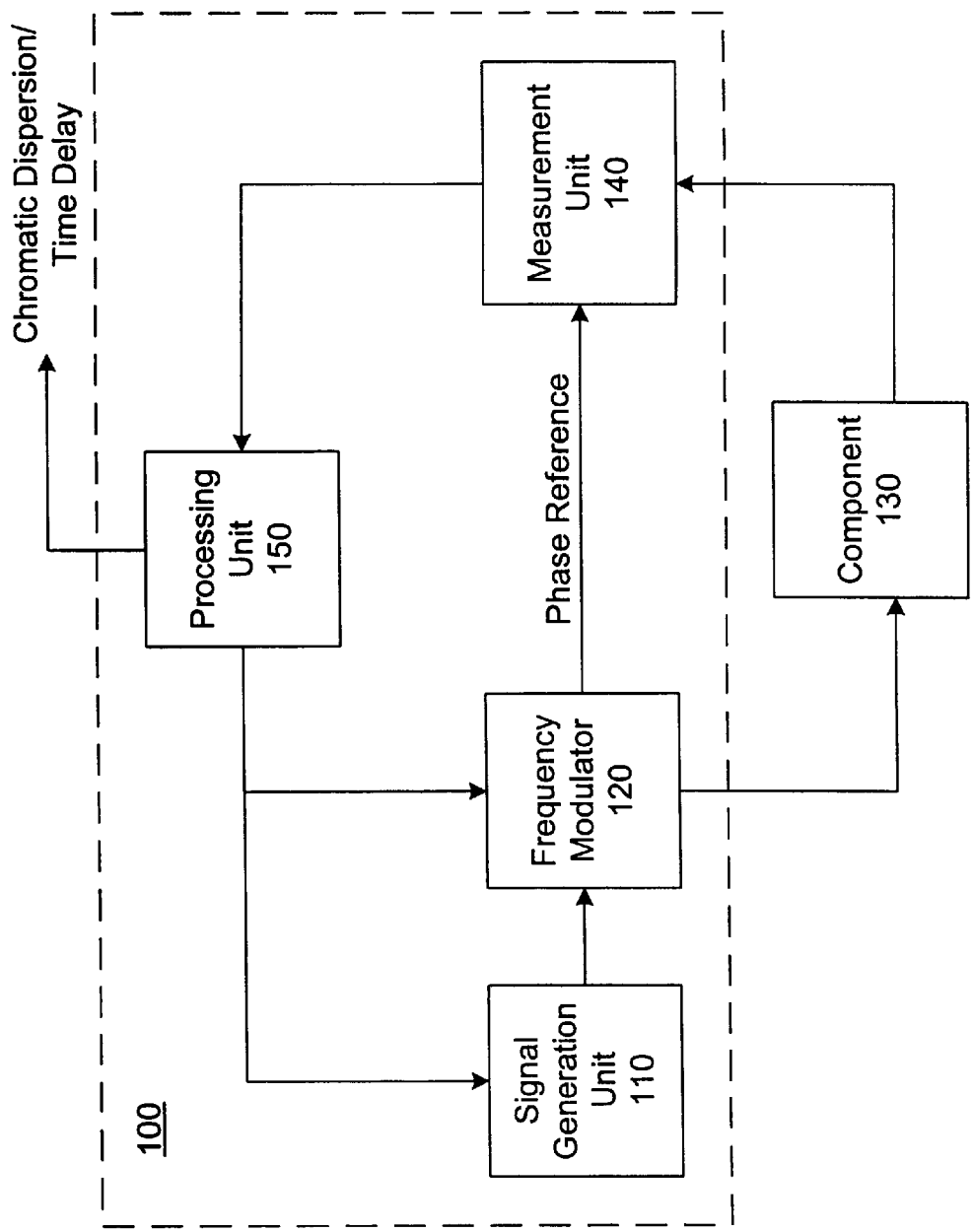
FIG. 2 is a block diagram of a system for measuring the time delay and chromatic dispersion of a component consistent with the present invention.

FIG. 2 is a block diagram of a system 100 for measuring the time delay and chromatic dispersion of a component consistent with the present invention. As shown in FIG. 2, a measurement system 100 includes an optical signal generation unit 110, a variable frequency amplitude modulator 120, a measurement unit 140, and a processing unit 150. The measurement unit 100 is used to test a component 130. The signal generation unit 110 can be, for example, a tunable laser source for generating optical signals of varying wavelengths. The measurement unit 140 can include, for example, an optical detector and an electrical network analyzer for measuring the phase and magnitude of optical signals output from the component 130. The processing unit 150 may be implemented in hardware, such as an ASIC or a microprocessor with an arithmetic logic unit, in software, such as an application program, or a combination thereof.

Figure 3:
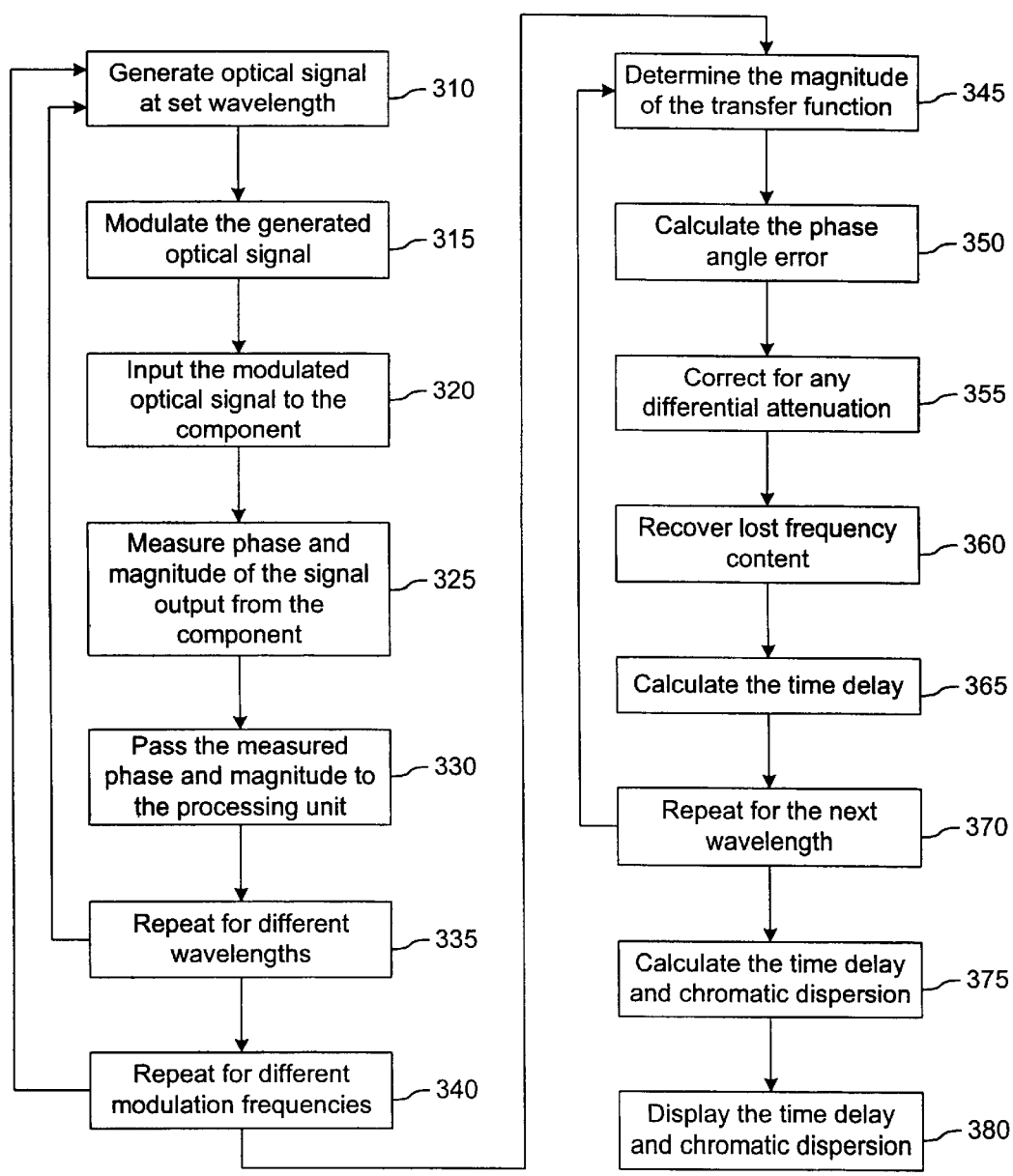
FIG. 3 is a flow diagram for measuring the time delay and chromatic dispersion of a component consistent with the present invention.

FIG. 3 is a flow diagram showing a process for measuring the time delay and chromatic dispersion of a component consistent with the present invention using measurement system 100. In operation, the signal generation unit 110 generates an optical signal at a wavelength designated by the processing unit 150 (step 310). The optical signal generated by the signal generation unit 110 is then passed to the frequency amplitude modulator 120, which modulates the generated optical signal at a modulation frequency designated by the processing unit 150 (step 315). The modulated signal is input to the component 130, which produces an output received by the measurement unit 140 (step 320). The measurement unit 140 measures the phase and magnitude of the signal output from the component 130 using, in part, a phase reference signal from the frequency modulator 120 (step 325).

The phase and magnitude measured by the measurement unit 140 are passed to the processing unit 150 (step 330). The steps are then repeated for different wavelengths (step 335). After all of the measurements have been made for all of the wavelengths at that modulation frequency, the steps are repeated for further modulation frequencies (step 340).

Depending upon the type of signal generation unit 110 and the number of modulations used to determine the time delay and chromatic dispersion, a sweep analysis or a step approach may be used. A sweep analysis produces optical signals at a series of wavelengths for a particular modulation frequency before changing the modulation frequency. A step approach produces an optical signal at a particular wavelength, which is then modulated at each of the different modulation frequencies used to determine the chromatic dispersion before changing the wavelength.

After all of the measurements have been made for all of the wavelengths at each of the different modulation frequencies, the processing unit 150 determines the magnitude of the transfer function of the component being tested (step 345). The processing unit 150 also is calculates a phase angle error (step 350). The phase angle error is used to remove any differential attenuation (step 355). The processing unit then applies signal processing to the measurements at the two or more modulation frequencies to recover any lost frequency content (step 360). The processing unit 150 removes the differential attenuation and recovers any lost frequency content to calculate the time delay of the component 130 (step 365). Steps 350 through 370 are then repeated for the next wavelength (step 370). Based upon the calculated time delays for a number of different wavelengths, the processing unit 150 can also determine the chromatic dispersion of the component 130 (step 375). The calculated chromatic dispersion and time delay is then output from the processing unit 150 (step 380). For example, the calculated chromatic dispersion and time delay may be produced to a user in a meaningful format, such as on a display.

The following description first addresses in more detail how to correct the measurement for differential attenuation of the two sidebands. The description thereafter addresses in more detail how to recover the high frequency content to correctly measure the differential phase, which is used to determine the time delay and the chromatic dispersion.

The initial task in correcting for the differential attenuation, which may result, for example, from the amplitude filtering characteristics of the test component 130, is to measure a photocurrent response of the test component 130 with the measurement unit 140 in terms of an input electric field and the transfer function of the test component. The photocurrent may be measured as an electrical current generated at the electrical port of a photodiode in response to light that is absorbed by the photodiode. Let the transfer function of the test component be $H(\omega)$ and the input electric field be described by $E_1(\omega)$.

Figure 4:
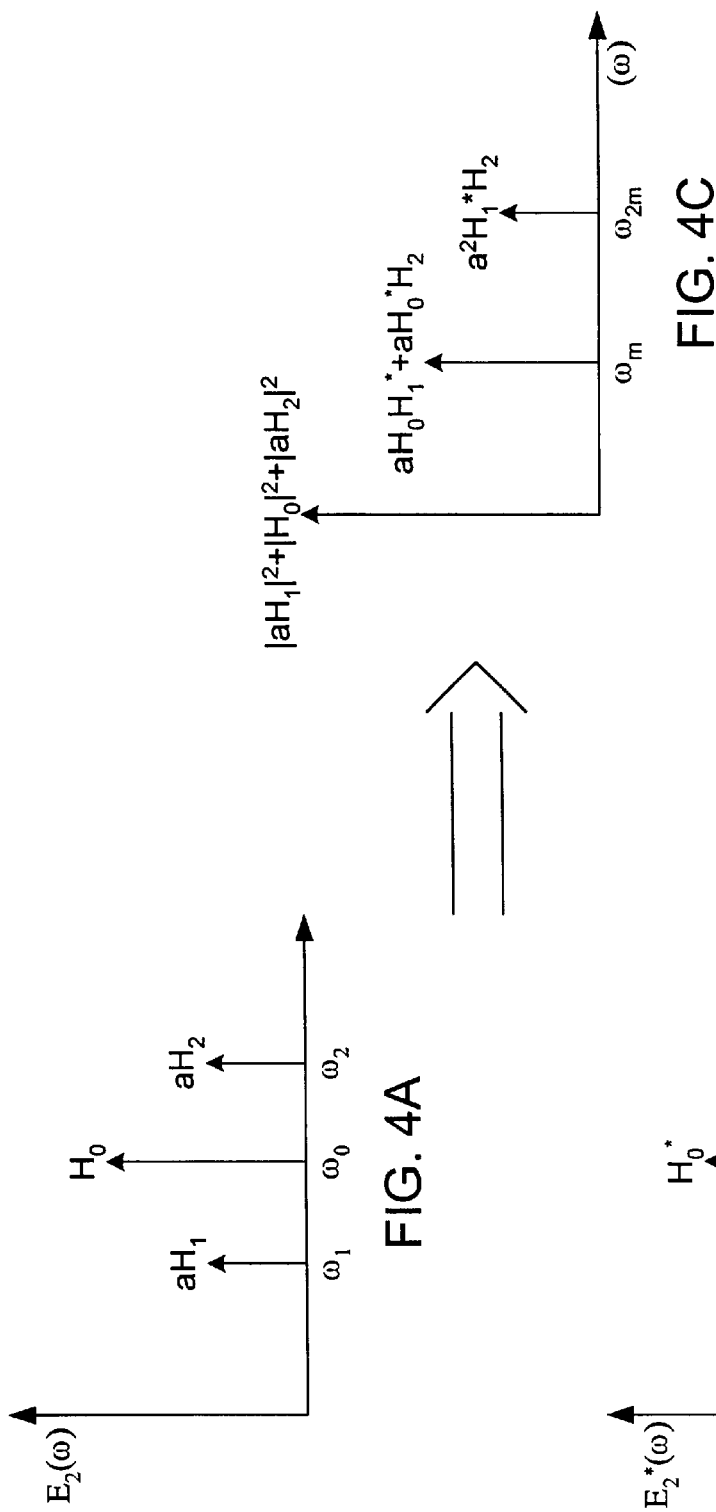
FIGS. 4A–4C are graphical representations of the sidebands in an input field used to determine a detected photocurrent.

As a simplifying step, it is assumed that the input electric field has only two AM sidebands. The higher order sidebands are assumed to be negligible but could be added to this analysis if needed. The output electric field can be expressed as:

$$E_2(\omega) = H(\omega) E_1(\omega)$$

and the photocurrent response can be expressed as:

$$i(t) = |e_2(t)|^2$$

where $e_2(t)$ is the inverse Fourier transform of the frequency domain signal $E_2(\omega)$. The frequency domain representation of the photocurrent $I(\omega)$ can be expressed as a self convolution of the incident electric field:

$$I(\omega) = E_2(\omega) * E_2^*(-\omega)$$

where $E_2^*$ represents the conjugate value of $E_2$. Since there is one optical frequency and only two sidebands in the input electric field, as shown in FIGS. 4A–4C, the convolution can be done by inspection. FIG. 4A is a graphical representation of the output electric field, FIG. 4B is a graphical representation of the conjugate of the output optical field and FIG. 4C is a graphical representation of the resulting convolution. The component of the photocurrent at the modulation frequency $\omega_m$ of the input electric field is given by:

$$I_m = a H_0 H_1^* + a H_0^* H_2$$

where $I_m$ is the measured photocurrent, $H_0$ is the transfer function at the one optical frequency, $H_1$ is the transfer function at one sideband, $H_2$ is the transfer function at the other sideband, and * indicates the conjugate value of the transfer function. Accordingly, the fundamental component of the photocurrent, which corresponds to the photocurrent at $\omega_m$, can be expressed in the parameters of the transfer function being measured. The fundamental component of the photocurrent can also be referred to as the first harmonic.

Based on this expression of the photocurrent, a relationship between the phase of the photocurrent and the magnitude and phase of the transfer function can be derived. This relationship can be obtained by thinking of the photocurrent as being the sum of two vectors with the appropriate magnitude and phase as set by the above equation. The magnitude and phase of the transfer function $H(\omega)$ can be expressed as:

$$H(\omega)=|H|e^{j\phi}$$

and the first harmonic of the photocurrent $I_m$ can be expressed as:

$$I_m=|I_m|e^{j\theta_m}$$

where $\phi$ represents the phase of the electric field and $\theta_m$ represents the phase of the photocurrent.

When calculating the vector summation of the two vector components, the constant "a" term in the above equation for the component of the photocurrent at the modulation frequency of the input electric field can be dropped since it will not affect the phase relationship. The goal is to obtain the phase difference $(\phi_2-\phi_1)/2$, which represents a sampling of the transfer function by the two AM sidebands.

When the magnitude of the transfer function is constant (i.e. $|H_0H_1|=|H_0H_2|$), such as in the case of measuring a fiber span, the phase angle of the photocurrent $\theta_m$ is equal to $(\phi_2-\phi_1)/2$. When measuring devices such as WDM components or fiber Bragg gratings, however, the magnitude of the transfer function is not constant, which causes an error in the relationship between the photocurrent and the phase difference along the transfer function.

Figure 5:
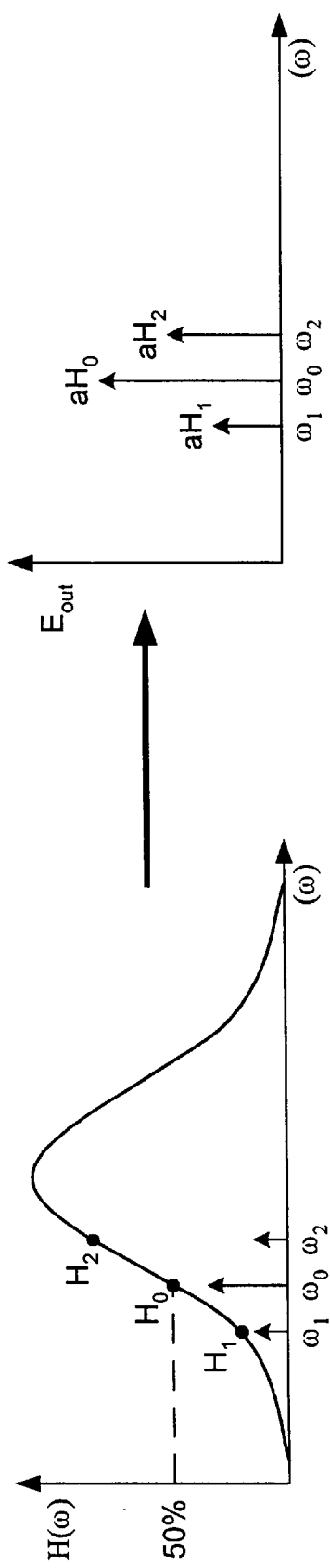
FIG. 5 is a graphical representation of an optical signal transmitted through a Fabry-Perot filter.

For example, when the optical component is a Fabry-Perot filter (a bandpass filter), the biggest change in attenuation with respect to wavelength occurs where the transmission through the filter is approximately 50%, as shown in FIG. 5. In FIG. 5, an optical signal at $\omega_0$ has two sidebands at $\omega_1$ and $\omega_2$, each having the same magnitude. After transmitting the optical signal through the Fabry-Perot filter, the signal at coo transmits at 50%. The sideband at $\omega_2$ transmits at more than 50%, however, while the other sideband at $\omega_1$ transmits at less than 50%. Since the amount of transmission corresponds to the transfer function of the Fabry-Perot filter, a difference in magnitude in the two sidebands results, which is referred to as differential attenuation.

Figure 6:
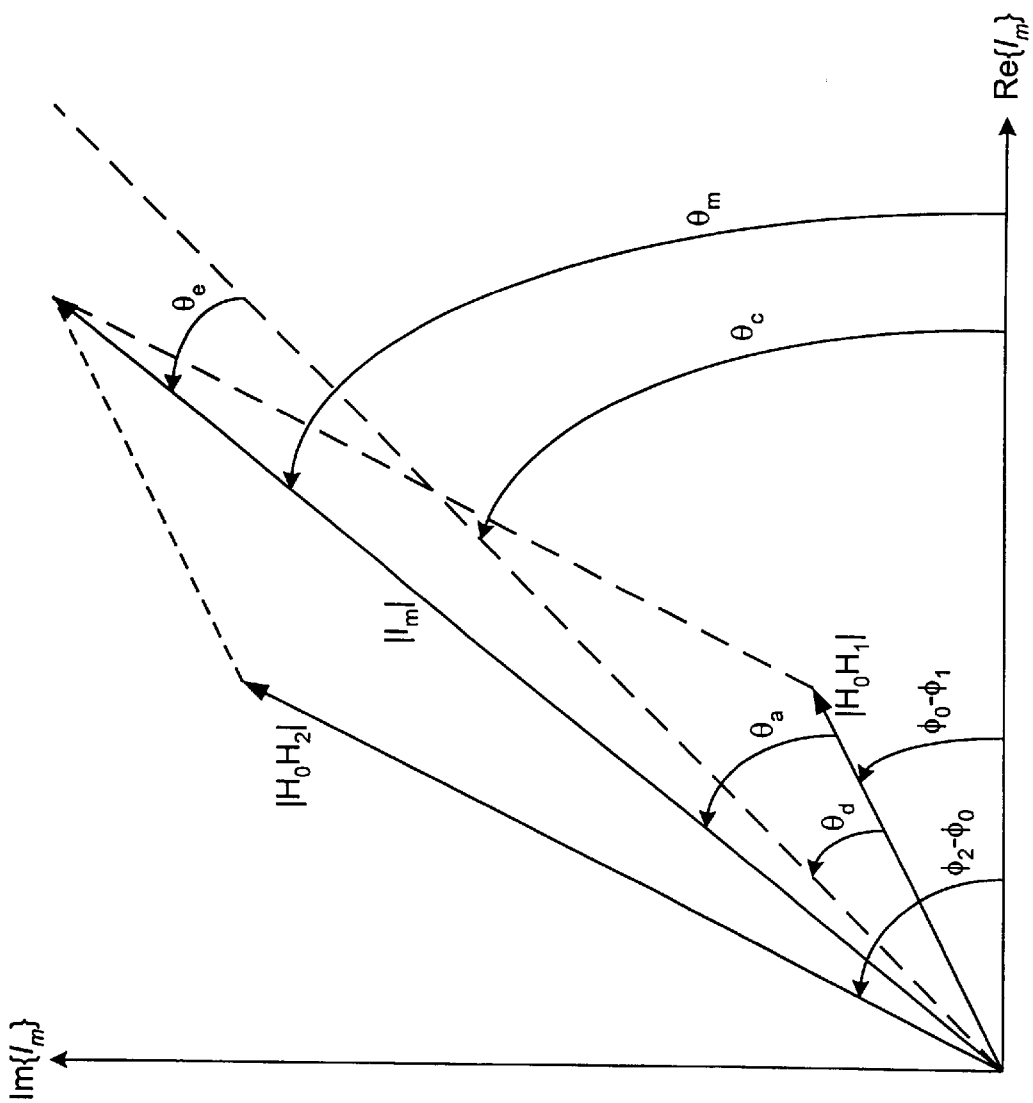
FIG. 6 is a graphical representation of a measured phase showing its vector components.

As shown in the vector diagram of FIG. 6, the measured photocurrent phase angle $\theta_m$ is equal to a desired or correct phase difference $\theta_c$ plus a phase angle error $\theta_e$:

$$\theta_m=\theta_c+\theta_e$$

where $$\theta_c=(\phi_2-\phi_1)/2$$

There are two expressions for the phase angle error $\theta_e$, depending on the relative magnitudes of $|H_1|$ and $|H_2|$. These two expressions are:

$$\theta_e=\theta_a-\theta_d \text{ when } |H_2|>|H_1|$$

and $$\theta_e=\theta_d-\theta_a \text{ when } |H_1|>|H_2|$$

As shown in FIG. 6, the angle $\theta_d$ is equal to half the angular separation between the two vectors that sum to produce the photocurrent signal. The angle $\theta_a$ is equal to the angular separation between the first vector and the vector corresponding to the sum of the first and second vectors. The physical significance of $\theta_d$ is that it is proportional to the amount of dispersion that occurs between the two AM sidebands. As the dispersion gets small, the two vector components point in the same direction and the magnitude of the photocurrent response simply becomes $|I_m|=|H_0H_1|+|H_0H_2|$. The relationship between the dispersion and $\theta_d$ is:

$$\theta_d = \frac{(\phi_2-\phi_0)-(\phi_0-\phi_1)}{2} = \left(\frac{\omega_m}{\omega_0}\right)^2 \pi c \frac{\partial \tau}{\partial \lambda}$$

The expressions for $\theta_a$ and $\theta_d$ can be obtained in terms of just the magnitudes of the photocurrent and the optical transfer function. Using the trigonometric identity $c^2=a^2+b^2-2ab\cos(\theta_c)$ we can write expression for the angle $\theta_a$ as:

$$|H_0H_2|^2=|I_m|^2+|H_0H_1|^2-2|I_m||H_0H_1|\cos(\theta_a)$$

and write the expression for the angle $\theta_d$ as:

$$|I_m|^2=|H_0H_1|^2+|H_0H_2|^2-2|H_0H_1||H_0H_2|\cos(\pi-2\theta_d)$$

To solve for these two angles, the magnitude of the transfer function is measured. This magnitude can be measured using the same measurement equipment that is used to make the conventional chromatic dispersion measurements. There are several possible procedures for making this measurement. By measuring the magnitude of the transfer function, the differential attenuation can be corrected. The procedure described below is an example of one possible procedure for making the measurement of the transfer function and correcting for differential attenuation.

Figure 7:
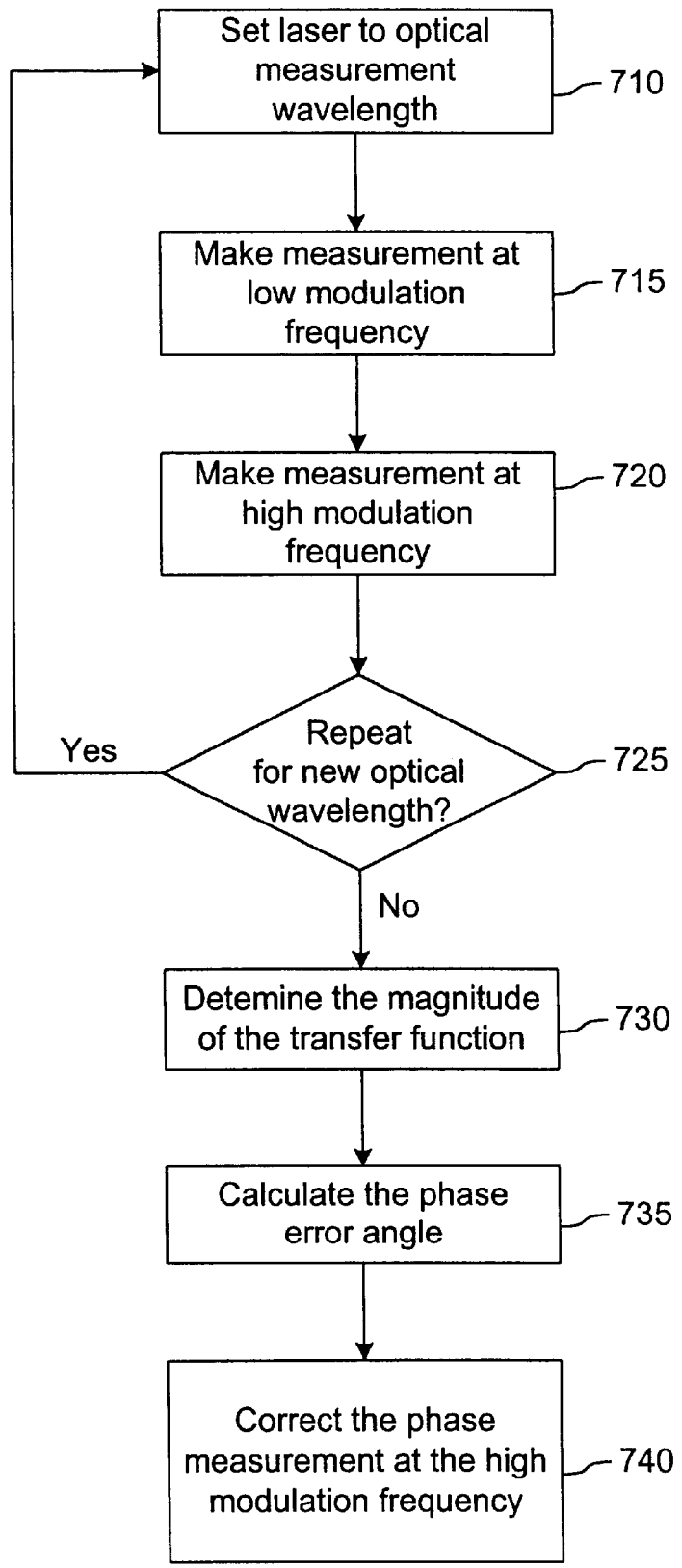
FIG. 7 is a flow diagram of a process for removing the differential attenuation of the measured phase of an optical signal transmitted through a component consistent with the present invention.

As shown in FIG. 7, a tunable laser is first set to an optical measurement wavelength (step 710). A first measurement is made at a low modulation frequency $f_{m1}$ (step 715). The low modulation frequency $f_{m1}$ is preferably set so that the dispersion between the two AM sidebands is minimized and the measured photocurrent can be assumed to be proportional to the magnitude of the optical transfer function. This modulation frequency may be, for example, approximately 100 MHz.

$$|I_m|\approx 2|H|^2 \text{ since } \theta_d\approx 0 \text{ and } |H_0|\approx|H_1|\approx|H_2|$$

With the tunable laser still at the same wavelength, another photocurrent measurement is made with a higher modulation frequency $f_{m2}$ (step 720). The higher modulation frequency $f_{m2}$ is preferably set for maximum time delay accuracy. In a preferred embodiment, the higher modulation frequency $f_{m2}$ is set between 2 and 2.5 GHz. Although not required, it is preferable that a second measurement is also made at a higher modulation frequency but different from $f_{m2}$. This second measurement at a higher modulation frequency is useful in recovering the high frequency content, as discussed below. Both the phase $\theta_m$ and magnitude $|I_m|$ of the measurement at the higher modulation frequency $f_{m2}$ are used. This measurement sequence can be then repeated for the next optical wavelength position (step 725). The sequence of taking measurements at two modulation frequencies at each optical wavelength is suggested since the time consuming step is generally the tuning of the laser frequency. If this is not the case, the laser could be swept twice, and preferably a third time for the second measurement at a higher modulation frequency, keeping the modulation frequency constant during each sweep.

The measurements at the low modulation frequency signal are used to determine the magnitude of the transfer function of the component being tested (step 730). Other methods may be used to determine the magnitude of the transfer function. Regardless of the method that is used to determine the magnitude of the transfer function, it is preferable that some of the frequencies used correspond to the sideband frequencies of the optical frequency of interest or of other nearby measurements for which the magnitude of the sideband frequencies can be obtained by interpolation. If the magnitude of the transfer function is already known, a separate step for determining the magnitude of the transfer function is unnecessary.

To obtain the optical transfer functions at the low modulation frequency $f_{m1}$, measurements are made at each of a number of different wavelengths within a particular range. The number of different wavelengths may be, for example, one thousand or more. The range should cover the wavelength range between the sidebands, In addition, it is preferable that, among the different wavelengths, there are wavelengths used that correspond to the sidebands. If no wavelengths are used that correspond to the sidebands, then it may be useful to interpolate the results of the measurements at the low modulation frequency $f_{m1}$ to determine the optical transfer functions at the sidebands. Again, as discussed above, the magnitude of the optical transfer function may be determined by other methods without using a low modulation frequency signal to measure it.

Once the data is collected for the two modulation frequencies at all of the optical wavelengths, signal processing can be performed to correct the phase measurement at the higher modulation frequency $f_{m2}$. The angles $\theta_a$ and $\theta_d$ used to determine the phase angle error $\theta_e$ can be calculated by rearranging the above equations, i.e., $$\cos(\theta_a) = \frac{|I_m|^2 + |H_0 H_1|^2 - |H_0 H_2|^2}{2|I_m||H_0 H_1|}$$

$$\cos(2\theta_d) = \frac{|I_m|^2 - |H_0 H_1|^2 - |H_0 H_2|^2}{2|H_0 H_1||H_0 H_2|}$$

where the magnitudes for the optical transfer functions $H_0$, $H_1$ and $H_2$ are obtained at the low modulation frequency $f_{m1}$, and the magnitude of the photocurrent $|I_m|$ is obtained at the high modulation frequency $f_{m2}$. The values for $\theta_a$ and $\theta_d$ are obtained by taking the inverse cosine of the above equations.

The above two computed angles $\theta_a$ and $\theta_d$ can then be used to calculate the phase angle error $\theta_e$ (step 735). The phase angle error $\theta_e$ is then used to correct the measured phase angle $\theta_m$ made at $f_{m2}$ (step 740). This procedure can then be applied to at least one additional high modulation frequency to avoid nulls in the measured frequency response, as will be discussed below. In particular, by using more than one high modulation frequency, it is possible to recover the high frequency content.

After correcting the measured phase angle $\theta_m$ with the phase angle error $\theta_e$, an accurate relationship between the phase of the measured signal and the time delay is obtained. Note that, if only a single high modulation frequency is used to determine the differential phase, which is used to determine the time delay and thereby the chromatic dispersion, some of the frequency content in the phase of the test component may be lost. By using two or more modulation frequencies to determine the differential phase, the loss of frequency content can be avoided. The process for recovering the high frequency content will be described with reference to FIG. 9, discussed below.

The time delay $\tau_g$ is determined from the corrected modulation phase angle as follows:

$$\theta_c = \tfrac{1}{2}(\phi_2 - \phi_1) = \tau_g \cdot \omega_m.$$

Figure 8:
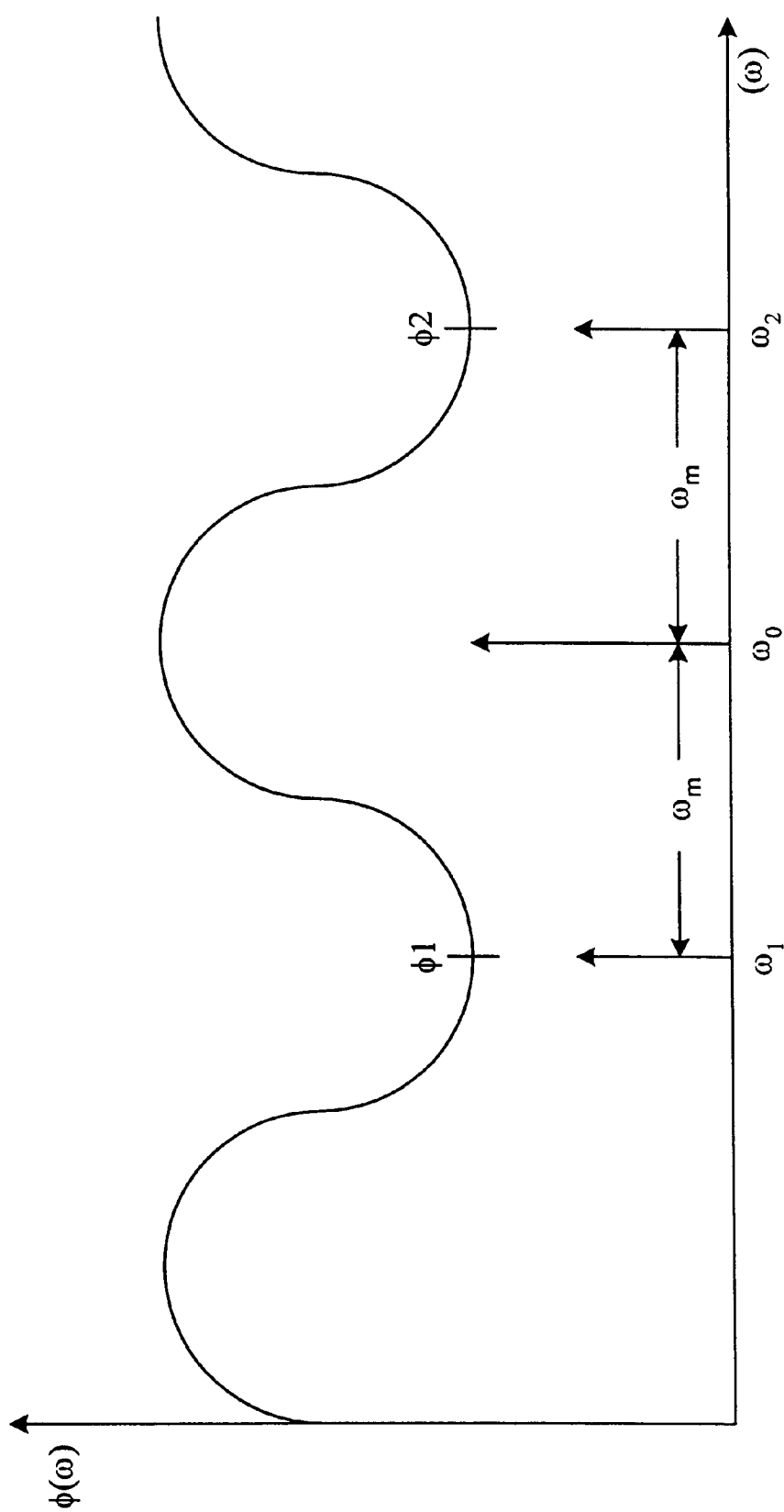
FIG. 8 is a graphical representation of a measured phase whose differential phase between the sidebands is zero.

As shown in FIG. 8, a sinusoidal variation in $\phi(\omega)$, whose period is equal to $2\omega_m$, is completely lost when only a single frequency is used to determine the differential phase.

To overcome this problem, it is preferable to make two or more measurements at relatively close high modulation frequencies. Although more than two measurements may be used, the following description will be based on two measurements for reasons of simplicity. However, it will be clear to one of ordinary skill in the art how more than two measurements may be used to recover the lost frequency content in the phase of the test component.

As discussed above, the time delay $\tau_g$ is approximately equal to:

$$\tau_g = \frac{\phi_2 - \phi_1}{2\omega_m} = \frac{\theta_c}{\omega_m},$$

where $\phi_2$ and $\phi_1$ are the phases of the sidebands of the modulated signal and $\omega_m$ is the modulation frequency. As also discussed above, this approximation breaks down when the time delay $\tau_g$ changes in the frequency range defined by AM sidebands. A more accurate relationship between $\tau_g$ and $\theta_c$ is:

$$\theta_c = \frac{1}{2}[\phi(\omega_0 + \omega_m) - \phi(\omega_0 - \omega_m)] = \frac{1}{2}\int_{\omega_0-\omega_m}^{\omega_0+\omega_m} \frac{d\phi}{d\omega} \cdot d\omega = \frac{1}{2}\int_{\omega_0-\omega_m}^{\omega_0+\omega_m} \tau_g \cdot d\omega$$

This relationship can also be written as a convolution where:

$$\theta_c(\omega) = \frac{1}{2}\int_{\omega_0-\omega_m}^{\omega_0+\omega_m} \tau_g \cdot d\omega = \frac{1}{2}\int_{-\infty}^{\infty} rect(2\omega_m) \cdot \tau_g \, d\omega = \frac{1}{2} rect(2\omega_m) * \tau_g(\omega)$$

With this "rect" function, any ripple in the phase or time delay at $2\omega_m$ may not be detected because it may be filtered out due to the sampling at only two points, $\omega_0 \pm \omega_m$. However, since it is known what the filtering function is, its effects can be filtered out. The filtering function is known because it can be determined merely from the modulation frequency. Filtering out these effects can be accomplished by taking the Fourier transform of the measured data $\theta_c(\omega)$. Letting the Fourier transform of $\theta_c(\omega)$ be equal to M(s), the result is:

$$M(s) = \mathcal{F}\left[\frac{1}{2}rect(2\omega_m) \cdot \tau_g(\omega)\right] = \frac{1}{2}\text{sinc}\left(\frac{2\pi s}{T_m}\right) \cdot T_g(s)$$

where $T_g(s)$ is equal to the Fourier transform of $\tau_g(\omega)$ and $T_m$ is equal to $2\pi/\omega_m$. The "sinc" function causes a filtering of the frequency components in the true time delay $\tau_g(\omega)$. The true time delay $\tau_g(\omega)$ can then be calculated by deconvolving out the filtering effects of the "sinc" function:

$$\tau_g(\omega) = \mathcal{F}^{-1}[T_g(s)] = \mathcal{F}^{-1}\left[\frac{2 \cdot M(s)}{\text{sinc}\left(\frac{2\pi s}{T_m}\right)}\right]$$

Figure 9:
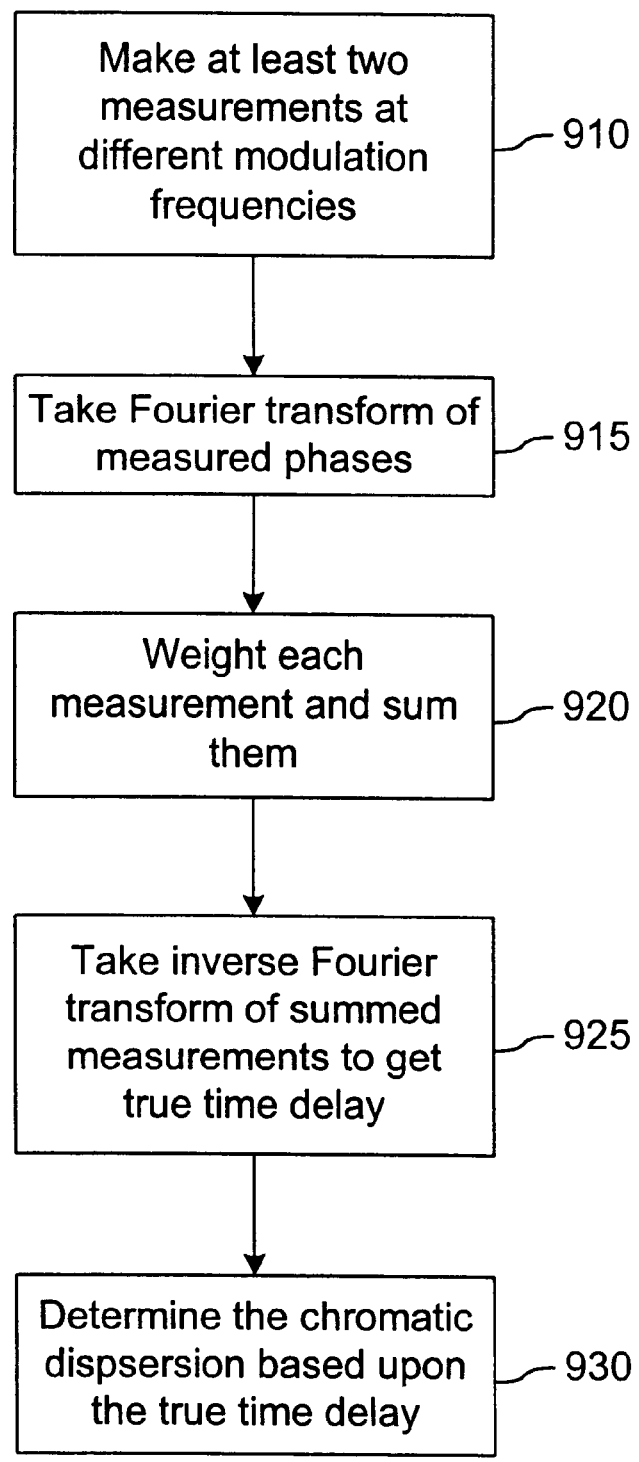
FIG. 9 is a flow diagram of a process for recovering lost frequency content in the measured phase of an optical signal transmitted through a component consistent with the present invention.

With only a single measured signal, it is not possible to regain $T_g(s)$ completely because the "sinc" function has zeros or nulls that completely eliminate some of its frequency components. To overcome this problem, two or more measurements are made with slightly different modulation frequencies $\omega_m$ so that information at the nulls can be reconstructed. As shown in FIG. 9, two measurements are made at modulation frequencies $\omega_{m1}$ and $\omega_{m2}$ (step 910). The two modulation frequencies $\omega_{m1}$ and $\omega_{m2}$ are preferably 20 to 25% apart but may be between 10 and 90% apart, and preferably in the range of 2 to 2.5 GHz. The relationship between the modulation frequencies $\omega_{m1}$ and $\omega_{m2}$ can be expressed, for example, as follows:

$$\omega_{m2} = \omega_{m1} + 0.25 * \omega_{m1}.$$

The Fourier transforms of the corrected phase difference is then taken (step 915). The Fourier transforms result in:

$$M_1(s) = \frac{1}{2}\operatorname{sinc}\left(\frac{2\pi s}{T_{m1}}\right) \cdot T_g(s) \text{ and } M_2(s) = \frac{1}{2}\operatorname{sinc}\left(\frac{2\pi s}{T_{m2}}\right) \cdot T_g(s),$$

respectively, where the corresponding transfer functions $H_1$ and $H_2$ are equal to:

$$H_1(s) = \frac{1}{2}\operatorname{sinc}\left(\frac{2\pi s}{T_{m1}}\right) \text{ and } H_2(s) = \frac{1}{2}\operatorname{sinc}\left(\frac{2\pi s}{T_{m2}}\right).$$

The transfer functions $H_1(s)$ and $H_2(s)$ have their zeros at different locations. The true response $T_g(s)$ can then be recovered by appropriately weighting each measurement and summing them together (step 920):

$$T_g(s) = a_1\left(\frac{M_1(s)}{H_1(s)}\right) + a_2\left(\frac{M_2(s)}{H_2(s)}\right).$$

The weighting functions may be varied, but are preferably equal to:

$$a_1 = \frac{H_1^2(s)}{H_1^2(s) + H_2^2(s)} \text{ and } a_2 = \frac{H_2^2(s)}{H_1^2(s) + H_2^2(s)},$$

such that $a_1 + a_2 = 1$.

Using these weightings, the time delay in the Fourier domain becomes:

$$T_g(s) = \frac{H_1(s)}{H_1^2(s) + H_2^2(s)} \cdot M_1(s) + \frac{H_2(s)}{H_1^2(s) + H_2^2(s)} \cdot M_2(s).$$

To obtain the true time delay $\tau_g(\omega)$, the inverse Fourier transform of $T_g(s)$ is made (step 925). Once the true time delay is known, the chromatic dispersion of the test component can be determined (step 930). The chromatic dispersion is obtained by calculating the derivative of the time delay with respect to wavelength. In general, the calculation of the true time delay is sufficient to understand the operation of the test device, thereby making the calculation of the chromatic dispersion unnecessary.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for measuring time delay of a component, comprising: measuring the phase and magnitude of at least two optical signals output from the component, the at least two optical signals having different modulation frequencies;
   adjusting the measured phase and magnitude of the at least two optical signals, wherein the adjusting includes:
      correcting the measured magnitude of the at least two optical signals for differential attenuation; and
      recovering frequency content in the measured phase of the at least two optical signals; and
   determining the time delay of the component based upon the adjusted phase and magnitude of the at least two optical signals.

2. A method according to claim 1, further comprising:
   transmitting the at least two optical signals through the component, each optical signal being transmitted at a plurality of wavelengths.

3. A method for measuring time delay of a component, comprising:
   transmitting a first optical signal at a plurality of wavelengths through the component, the first optical signal having a first modulation;
   measuring the phase and magnitude of the first optical signal output from the component;
   determining a magnitude of the transfer function of the component; determining a phase angle error based upon the determined magnitude of the transfer function and the measured magnitude and phase of the first optical signal;
   correcting the measured phase of the first optical signal output from the component in accordance with the phase angle error; and
   determining the time delay of the component based upon the measured phase of the first optical signal after correcting the measured phase.

4. A method according to claim 3, further comprising:
   transmitting a second optical signal at a plurality of wavelengths through the component, the second optical signal having a second modulation;
   measuring the phase and magnitude of the second optical signal transmitted through the component; and
   determining a second phase angle error based upon the determined magnitude of the transfer function and the measured magnitude and phase of the second optical signal;
   wherein the correcting the measured phase includes correcting the measured phase of the second optical signal output from the component in accordance with the second phase angle error, and
   wherein determining the time delay includes determining the time delay of the component based upon the measured phase of the first optical signal output from the component and the measured phase of the second optical signal output from the component after correcting the measured phase.

5. A method according to claim 4, wherein determining the magnitude of the transfer function includes:
   transmitting a third optical signal at a plurality of wavelengths through the component, the third optical signal having a third modulation which is lower in frequency than the frequency of the first and second modulations; and measuring the magnitude of the third optical signal to determine the magnitude of the transfer function of the component.

6. A method according to claim 5, wherein the frequency of the third modulation is less than one fifth of the frequency of the first and second modulations.

7. A method according to claim 4, wherein the first and second modulations have a frequency ratio of less than 90 percent.

8. A method according to claim 4, wherein the step of determining the time delay includes:

taking a Fourier transform of the measured phase of the first optical signal output from the component and the measured phase of the second optical signal output from the component;

weighting each of the transformed measured phases of the first and second optical signals output from the component after performing the Fourier transform taking step to generate respective weighted values;

summing the weighted values;

taking the inverse Fourier transform of the summed weighted values to obtain a true time delay; and determining the time delay based upon the true time delay.

9. A method according to claim 3, further comprising:

determining the chromatic dispersion of the component based upon the determined time delay.

10. A method for measuring time delay of a component, comprising:

transmitting a first optical signal at a plurality of wavelengths through the component, the first optical signal having a first modulation;

transmitting a second optical signal at a plurality of wavelengths through the component, the second optical signal having a second modulation;

measuring the phase of the first and second optical signals output from the component;

taking a Fourier transform of the measured phase of the first optical signal output from the component and the measured phase of the second optical signal output from the component;

weighting each of the measured phases of the first and second optical signals output from the component after performing the Fourier transform taking step to generate respective weighted values;

summing the weighted values;

taking the inverse Fourier transform of the summed weighted values to obtain a true time delay; and determining the time delay based upon the true time delay.

11. A method according to claim 10, wherein the first and second modulations have a frequency ratio of less than 90 percent.

12. A method according to claim 10, wherein determining the time delay of the component includes determining the time delay of the component based upon the measured phase of at least one optical signal in addition to the first and second optical signals.

13. A method according to claim 10, further comprising:

determining the chromatic dispersion of the component based upon the determined time delay.

14. A system for measuring time delay of a component, comprising:

a processing unit;

a signal generation unit, coupled to the processing unit, which transmits a first optical signal at a plurality of wavelengths through the component according to a signal from the processing unit;

a frequency modulator, coupled to the processing unit, which modulates the first optical signal at a first modulation according to a signal from the processing unit; and a measurement unit which measures the phase and magnitude of the first optical signal output from the component, wherein the processing unit determines a phase angle error based upon a magnitude of the transfer function of the component and the measured magnitude and phase of the first optical signal, removes the determined phase angle error from the measured phase of the first optical signal output from the component, and determines the time delay of the component based upon the measured phase of the first optical signal after removing the phase angle error.

15. A system according to claim 14, wherein the signal generation unit transmits a second optical signal at a plurality of wavelengths through the component, the frequency modulator modulates the second optical signal at a second modulation, the measurement unit measures the phase and magnitude of the second optical signal transmitted through the component, and the processing unit determines a second phase angle error second phase error based upon the magnitude of the transfer function and the measured magnitude and phase of the second optical signal, removes the second phase angle error from the measured phase of the second optical signal output from the component, and determines the time delay of the component based upon the measured phase of the first optical signal output from the a component and the measured phase of the second optical signal output from the component after removing the phase angle error.

16. A system according to claim 14, wherein the processing unit determines the chromatic dispersion of the component based upon the determined time delay.

17. A system according to claim 15, wherein the signal generation unit transmits a third optical signal at a plurality of wavelengths through the component, the frequency modulator modulates the third optical signal at a third modulation which is lower in frequency than the frequency of the first and second modulations, and the processing unit uses a measured magnitude of the optical signal to determine the transfer function of the component.

18. A system for measuring time delay of a component, comprising:

a signal generation unit which transmits a first optical signal at a plurality of wavelengths through the component and a second optical signal at a plurality of wavelengths through the component, a frequency modulator which modulates the first optical signal at a first modulation and modulating the second optical signal at a second modulation;

a measurement unit which measures the phase of the first and second optical signals output from the component; and a processing unit configured to:

take a Fourier transform of the measured phase of the first optical signal output from the component and the measured phase of the second optical signal output from the component;

weight each of the measured phases of the first and second optical signals output from the component after taking the Fourier transform to generate respective weighted values;

sum the weighted values;

take the inverse Fourier transform of the summed weighted values to obtain a true time delay; and determine the time delay based upon the true time delay.

19. A system according to claim 18, wherein the processing unit determines the chromatic dispersion of the component based upon the determined time delay.

20. A computer system comprising a device for measuring a time delay of a component, the device configured to:

transmit a first optical signal at a plurality of wavelengths through the component, the first optical signal having a first modulation;

transmit a second optical signal at a plurality of wavelengths through the component, the second optical signal having a second modulation;

measure the phase of the first and second optical signals output from the component: and take a Fourier transform of the measured phase of the first optical signal output from the component and the measured phase of the second optical signal output from the component;

weight each of the measured phases of the first and second optical signals output from the component after performing the Fourier transform taking step to generate respective weighted values;

sum the weighted values;

take the inverse Fourier transform of the summed weighted values to obtain a true time delay; and determine the time delay based upon the true time delay.

21. A computer system according to claim 20, where the device is further configured to determine the chromatic dispersion of the component based upon the determined time delay.

* * * * *